(12) United States Patent
Pack et al.

(10) Patent No.: US 12,155,535 B2
(45) Date of Patent: Nov. 26, 2024

(54) DYNAMIC SPLIT COMPUTING FRAMEWORK IN SERVERLESS EDGE COMPUTING

(71) Applicant: KOREA UNIVERSITY RESEARCH AND BUSINESS FOUNDATION, Seoul (KR)

(72) Inventors: Sangheon Pack, Seoul (KR); Haneul Ko, Sejong-si (KR); Daeyoung Jung, Seoul (KR); Hyeon Jae Jeong, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 0 days.

(21) Appl. No.: 18/110,083

(22) Filed: Feb. 15, 2023

(65) Prior Publication Data

US 2024/0137287 A1    Apr. 25, 2024

(30) Foreign Application Priority Data

Oct. 17, 2022    (KR) .................. 10-2022-0133449

(51) Int. Cl.
*H04L 41/16* (2022.01)
*H04L 43/0894* (2022.01)

(52) U.S. Cl.
CPC .......... *H04L 41/16* (2013.01); *H04L 43/0894* (2013.01)

(58) Field of Classification Search
CPC ..... H04L 41/16; H04L 43/0894; G06N 3/045; G06N 3/08; G06N 5/04; Y02D 10/00
See application file for complete search history.

(56) References Cited

U.S. PATENT DOCUMENTS

| | | | |
|---|---|---|---|
| 2022/0300618 A1* | 9/2022 | Ding | G06F 21/60 |
| 2022/0311678 A1* | 9/2022 | Karjee | G06N 3/0464 |
| 2022/0327359 A1* | 10/2022 | Ahuja | G06N 3/063 |
| 2023/0038071 A1* | 2/2023 | Shen | H04W 72/02 |
| 2023/0275812 A1* | 8/2023 | Filoche | G06N 3/045 |
| | | | 706/12 |
| 2024/0107594 A1* | 3/2024 | Guan | H04W 76/10 |

FOREIGN PATENT DOCUMENTS

| | | |
|---|---|---|
| KR | 10-0612059 B1 | 8/2006 |
| KR | 10-2113662 B1 | 5/2020 |
| KR | 10-2022-0113714 A | 8/2022 |
| WO | WO-2022092859 A * 5/2022 | ............ G06N 20/00 |

* cited by examiner

*Primary Examiner* — Schquita D Goodwin
*Assistant Examiner* — Mehulkumar J Shah
(74) *Attorney, Agent, or Firm* — NSIP Law

(57) ABSTRACT

Disclosed is a split computing device operating in a serverless edge computing environment. The split computing device includes a transceiver configured to receive resource information of a terminal from the terminal and to measure a data transmission rate between the terminal and the split computing device in a process of receiving the resource information of the terminal; and a splitting point deriver configured to determine a splitting point of a deep neural network (DNN) model for split computing and an activation status of a container instance for each of tail models of a DNN corresponding to the respective splitting points using the resource information of the terminal, the data transmission rate, and resource information of the split computing device.

5 Claims, 3 Drawing Sheets

DYNAMIC SPLIT COMPUTING FRAMEWORK IN SERVERLESS EDGE COMPUTING

CROSS-REFERENCE TO RELATED APPLICATIONS

This application claims the benefit under 35 USC § 119(a) of Korean Patent Application No. 10-2022-0133449 filed on Oct. 17, 2022 in the Korean Intellectual Property Office, the entire disclosure of which is incorporated herein by reference for all purposes.

BACKGROUND

1. Field

At least one example embodiment relates to split computing in a serverless edge computing environment.

2. Description of Related Art

An existing deep neural network (DNN) inference method has a structure in which output for an entire DNN model is derived from a single device (e.g., a mobile device and an edge cloud). Inference refers to a process of deriving results by inputting new data into a model generated through learning after a learning stage of updating a model parameter.

An existing DNN inference structure does not transmit raw data to an edge cloud when the entire DNN inference is performed by a mobile device. However, due to limited computing power of the mobile device, a high inference latency may occur. On the contrary, when the entire DNN inference is performed by the edge cloud, an inference latency may be reduced using high computing power and resources of the edge cloud. However, there is overhead of having to transmit raw data to the edge cloud and traffic by a plurality of inference services may cause overhead in the edge cloud.

Split computing allows inference to be performed on a plurality of devices such that a work may be flexibly performed according to a computing capability and a network status of each corresponding device. Split computing generally selects a DNN layer splitting point, divides a DNN into head and tail models, and distributes the head model to a mobile device and distributes the tail model to an edge cloud. This structure appropriately selects a splitting point according to computing power, energy, a resource, and a communication status of a device such that advantages of the mobile device and the edge cloud may be flexibly used. However, in split computing, since an inference latency, energy consumption of the mobile device, and resource consumption of the edge cloud vary according to a DNN splitting point, it is important to find an appropriate splitting point.

Meanwhile, serverless computing, as one of cloud computing models, refers to technology that allows a developer to develop applications free from server management difficulty, such as server resource allocation, using a cloud service (e.g., AWS Lambda). That is, the developer does not directly increase or decrease available capacity of a server and a company providing a cloud service manages resources and an operating system (OS) and charges the developer for resource consumption. Therefore, serverless computing may dynamically allocate resources of the server by maintaining a cloud container instance to be in an inactive (cold) state when there is no user and switching a state of the cloud container instance to an active (warm) state. Meanwhile, for efficient resource availability, it is important to select an activation status of a container instance to minimize resource waste and meet service requirements, such as latency. For example, if a container instance is maintained in an inactive state, resource waste may decrease. However, if a user request is received, a long initial response time is required for instance activation. Conversely, if the container instance is active at all times, an initial response time is short but resource availability is low.

Existing split computing-related techniques do not assume a serverless computing environment. That is, since a container instance activation time is not considered, it is difficult to acquire a desired inference latency although the corresponding method applies to a serverless computing environment. Therefore, the present invention proposes a technique for simultaneously determining an appropriate DNN splitting point and an activation status of a container instance in a cloud in consideration of a dynamic system environment.

In split computing, an inference latency and energy consumption of a mobile device, power consumption of an edge cloud, and communication overhead are determined according to a DNN splitting point. However, although an optimal splitting point is applied, a long period of time of 2 to 5 seconds is required to activate a container instance that is in an inactive state. Therefore, it is difficult to return inference results within a required time. Conversely, maintaining an active state at all times is less efficient in terms of edge cloud resource efficiency. Therefore, it is necessary to maintain the active state of the container instance of the edge cloud to be less than or equal to a certain value (i.e., resource consumption).

To this end, the present invention proposes a method of dynamically determining an appropriate splitting point and an activation status of a container instance for split computing. The proposed method formulates a problem with a Constrained Markov Decision Process (CMDP) to determine the optimal splitting point and the activation status and finds an optimal stochastic policy with linear programming (LP).

SUMMARY

A technical subject of at least one example embodiment is to provide a dynamic split computing device and method that may derive a splitting point of a deep neural network (DNN) and an activation status of a container instance in a serverless edge computing environment.

A split computing device according to an example embodiment refers to a split computing device operating in a serverless edge computing environment and includes a transceiver configured to receive resource information of a terminal from the terminal and to measure a data transmission rate between the terminal and the split computing device in a process of receiving the resource information of the terminal; and a splitting point deriver configured to determine a splitting point of a deep neural network (DNN) model for split computing and an activation status of a container instance for each of tail models of a DNN corresponding to the respective splitting points using resource information of the terminal, the data transmission rate, and resource information of the split computing device.

According to some example embodiments, it is possible to select an appropriate DNN splitting point and an activation status of a cloud instance. Since a new decision is made every time in an edge cloud, it is possible to determine splitting and instance activation adaptive to a change in a dynamic network resource state and service requirements (e.g., latency) through the present invention.

In particular, a serverless computing environment used as a base environment in the present invention provides an application for executing a code only when requested, without maintaining a virtual server or a physical server. Since it is suitable for a service that requires low latency in video streaming or monitoring and facilitates infrastructure management, it is advantageous in terms of both development and system operation. Therefore, an efficient edge computing method based on a serverless computing environment may create various service application cases including split computing in the future.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
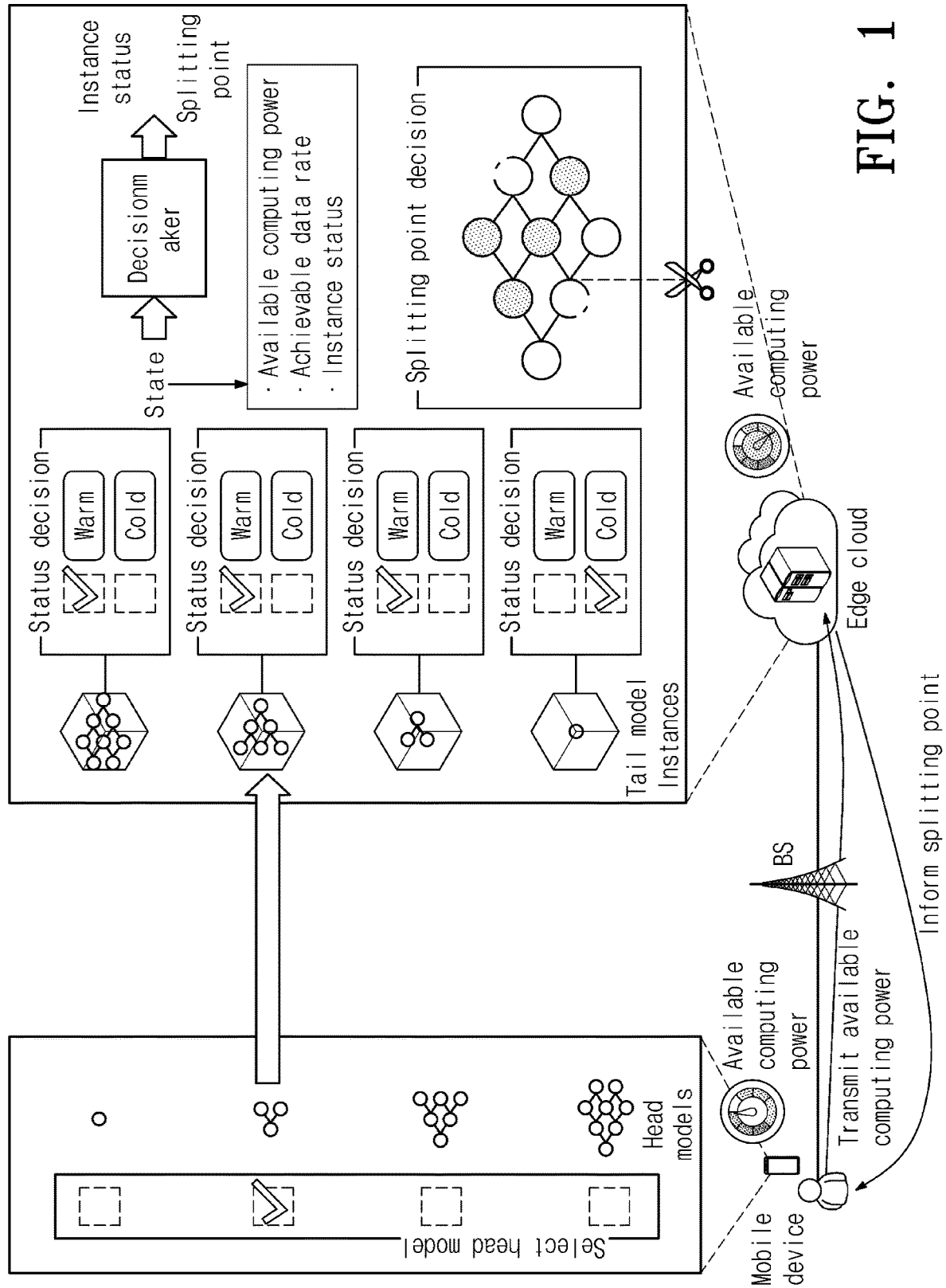
FIG. 1 illustrates a system according to an example embodiment.

Disclosed hereinafter are exemplary embodiments of the present invention. Particular structural or functional descriptions provided for the embodiments hereafter are intended merely to describe embodiments according to the concept of the present invention. The embodiments are not limited as to a particular embodiment.

Terms such as "first" and "second" may be used to describe various parts or elements, but the parts or elements should not be limited by the terms. The terms may be used to distinguish one element from another element. For instance, a first element may be designated as a second element, and vice versa, while not departing from the extent of rights according to the concepts of the present invention.

Unless otherwise clearly stated, when one element is described, for example, as being "connected" or "coupled" to another element, the elements should be construed as being directly or indirectly linked (i.e., there may be an intermediate element between the elements). Similar interpretation should apply to such relational terms as "between", "neighboring," and "adjacent to."

Terms used herein are used to describe a particular exemplary embodiment and should not be intended to limit the present invention. Unless otherwise clearly stated, a singular term denotes and includes a plurality. Terms such as "including" and "having" also should not limit the present invention to the features, numbers, steps, operations, subparts and elements, and combinations thereof, as described; others may exist, be added or modified. Existence and addition as to one or more of features, numbers, steps, etc. should not be precluded.

Unless otherwise clearly stated, all of the terms used herein, including scientific or technical terms, have meanings which are ordinarily understood by a person skilled in the art. Terms, which are found and defined in an ordinary dictionary, should be interpreted in accordance with their usage in the art. Unless otherwise clearly defined herein, the terms are not interpreted in an ideal or overly formal manner.

Hereinafter, example embodiments will be described with reference to the accompanying drawings. However, the scope of the patent application is not limited to or restricted by such example embodiments. Like reference numerals used herein refer to like elements throughout.

FIG. 1 illustrates a system according to an example embodiment. The system may also be referred to as a dynamic split computing system in a serverless edge computing environment and includes a (mobile) terminal (mobile device) and a server (edge cloud). Herein, the terms "terminal" and "mobile device" may be interchangeably used throughout. Split computing in the terminal and the server (edge cloud) is used to efficiently perform dynamic neural network (DNN) inference. That is, an entire DNN model having L layers are divided into head and tail models, the head model is provided to the terminal and the tail model is provided to the server (edge cloud). Referring to FIG. 1, it is assumed that the terminal and the server (edge cloud) include head and tail models according to all the splitting points. Therefore, regardless of which splitting point is selected, the terminal and the server (edge cloud) may perform an inference operation.

The terminal and the server may be implemented as a computing device that includes at least a processor and/or a memory. The computing device may include a smartphone, a personal computer (PC), a server, a tablet PC, and a laptop computer.

Also, a DNN described herein refers to a model for which predetermined learning is completed and may include, for example, an artificial neural network (ANN), a convolution neural network (CNN), a recurrent neural network (RNN), a multi layer perceptron (MLP), a long short-term memory (LSTM), a deep feedforward network (DFN), an autoencoder, a variational autoencoder (VAE), a deep residual network (DRN), a generative adversarial network (GAN), a graph convolutional network (GCN), a spiking neural network (SNN), and the like.

To determine a splitting point and a state of a cloud instance in the server (edge cloud), information of the terminal is required. Herein, it is assumed that the terminal transmits available energy (e.g., computing power) for inference to the server (edge cloud) in advance. In the case of a container instance, an initial instance state is randomly selected from active or inactive states. The server (edge cloud) may maintain or switch a state of a container instance every time T. Therefore, the server (edge cloud) may determine a DNN splitting point and a container instance state in consideration of resource information of the server (edge cloud), energy information of the terminal, and a data transmission rate between two devices when determining the splitting point.

The aforementioned information (e.g., energy information of the terminal, resource information of the server (edge cloud), state information of the container instance, and a data transmission rate) may be input as an input of a configuration (a decision maker of FIG. 1) that makes a decision within the server (edge cloud). The corresponding function is used to determine a splitting point and/or a state of a container instance as an output after performing the following operation procedure. For formulation of a system model, when the entire DNN model is split at an $l^{th}$ splitting point, it is defined that the server (edge cloud) maintains a container instance $I_{T,l}$ in an active (warm) state for inference of the tail model after an $l^{th}$ layer. Here, l denotes a natural number greater than or equal to 0 and less than or equal to L. The server (edge cloud) may determine a splitting point and/or a state of a container instance every time T. Here, T denotes a real number greater than 0. Such decision is to minimize an inference latency while maintaining average energy consumption of the terminal and average resource consumption of the server (edge cloud) to be less than or equal to a predetermined value (threshold). Here, the threshold may have a value preset by a manager and may vary depending on an environment and a policy.

When the splitting point is determined by the server (edge cloud), corresponding results are transmitted to the terminal. The terminal may perform inference on input raw data up to the splitting point according to the received determined splitting point and may transmit intermediate data that is output (i.e., output of the head model) to the server (edge cloud). The server (edge cloud) receives the intermediate data as input, performs inference on the intermediate data, derives a final output, and returns the derived final output to the terminal. The server (edge cloud) that receives the intermediate data from the terminal performs a process, such as instance initialization, for transition from an inactive (cold) state to an active (warm) state. Depending on example embodiments, the process such as instance initialization may be executed after decision on an instance state is made. That is, a response latency may be reduced by activating in advance a corresponding container instance.

Hereinafter, a method of determining a splitting point of a DNN and/or an activation status of a container instance is described.

Initially, constrained Markov decision process (CMDP) modelling is described in detail.

A state space is defined as in Equation 1.

$$S = C_M \times C_E \times R \times \prod_l W_l \qquad \text{[Equation 1]}$$

In Equation 1, $C_M$ and $C_E$ denote (available) computing power of the terminal and (available) computing power of the server (edge cloud), respectively. R denotes a data transmission rate between the terminal and the server (edge cloud), and $W_l$ denotes an activation status of a container instance when a container instance $I_{T,l}$ performs inference from an $l^{th}$ layer of a DNN at a time T and has a value of 0 or 1. Here, l denotes an active state and 0 denotes an inactive state.

When $C_M^{max}$ and $C_E^{max}$ denote maximum computing power of the terminal and maximum computing power of the server (edge cloud), respectively, $C_M$ and $C_E$ may be represented as Equation 2 and Equation 3, respectively.

$$C_M = \{u_C, 2u_C \ldots, C_M^{max}\} \qquad \text{[Equation 2]}$$

$$C_E = \{u_C, 2u_C \ldots, C_E^{max}\} \qquad \text{[Equation 3]}$$

In Equation 2 and Equation 3, $u_C$ denotes a unit of computing power.

R is represented as Equation 4.

$$R = \{R^{min}, R^{min} + u_R, \ldots, R^{max}\} \qquad \text{[Equation 4]}$$

In Equation 4, $u_R$ denotes a unit of the transmission rate, and $R^{min}$ and $R^{max}$ denote a minimum transmission rate and a maximum transmission rate, respectively.

$W_l$ has a value of 0 or 1 as in Equation 5.

$$W_l = \{0,1\} \qquad \text{[Equation 5]}$$

In Equation 5, $W_l$ indicates whether $I_{T,l}$ is in the active state. That is, if $W_l=1$, $I_{T,l}$ is in an active state, and otherwise, $I_{T,l}$ is in an inactive state.

An action space A is defined as Equation 6.

$$A = A_S \times \prod_l A_{W,l} \qquad \text{[Equation 6]}$$

In Equation 6, $A_S$ denotes a splitting point among $0^{th}$ to $L^{th}$ layers. Here, if $A_S=0$, it indicates that all the inference is performed by the server (edge cloud) and if $A_S=L$, it indicates that all the inference is performed by the terminal. Also, a layer up to an $l^{th}$ layer is referred to as a head model and a layer after the $l^{th}$ layer is referred to as a tail model. $A_{W,l}$ denotes an instance activation status and has a value of 0 or 1. Here, 1 denotes an active state and 0 denotes an inactive state. Since the model includes L layers, $A_S$ is represented as Equation 7.

$$A_S = \{0,1,\ldots,L\} \qquad \text{[Equation 7]}$$

Since each container instance $I_{T,l}$ is capable of maintaining an active state in the server (edge cloud), $A_{W,l}$ is represented as Equation 8.

$$A_{W,l} = \{0,1\} \qquad \text{[Equation 8]}$$

A transition probability P from a current state $S=[C_M, C_E, R, W]$ to a next state $S'=[C'_M, C'_E, R', W']$ is defined as Equation 9.

$$P[W'_l \mid W_l = 0, A_{W,l} = 0] = \begin{cases} 1, & \text{if } W'_l = 0 \\ 0, & \text{otherwise} \end{cases} \qquad \text{[Equation 11]}$$

A current state S and a next state S' are independent according to Markov chain definition. P is differently defined depending on whether a container instance of the server (edge cloud) is active as below. In addition to $W_l$, the transition probability for states of $C_M$, $C_E$, and R is statistically defined. The transition probability of $W_l$ is defined as the following four cases.

① If $A_{W,l}=1$, a probability that a container instance switches from an inactive state ($W_l=0$) to an active state is represented as Equation 10.

$$P[S' \mid S, A] = P[C'_M \mid C_M, A] \times \qquad \text{[Equation 9]}$$
$$P[C'_E \mid C_E, A] \times P[R' \mid R, A] \times \prod_l P[W'_l \mid W_l, A_{W,l}]$$

When an amount of time used for the container instance $I_{T,l}$ to switch from an inactive state to an active state follows an exponential distribution with mean of $1/\gamma_l$, a probability that an instance varies from the inactive state to the active state within a determined period $\tau$ is defined as $\gamma_l \tau$.

② If $A_{W,l}=0$, a probability that a container instance is maintained in an inactive state ($W_l=0$) is represented as Equation 11.

$$P[W'_l \mid W_l = 0, A_{W,l} = 1] = \begin{cases} \gamma_l \tau, & \text{if } W'_l = 1 \\ 1 - \gamma_l \tau, & \text{if } W'_l = 0 \\ 0, & \text{otherwise} \end{cases} \qquad \text{[Equation 10]}$$

③ If $A_{W,i}=1$, a probability that a container instance is maintained in an active state ($W_i=1$) is represented as Equation 12.

$$P[W_i' \mid W_i = 1, A_{W,i} = 1] = \begin{cases} 1, & \text{if } W_i' = 1 \\ 0, & \text{otherwise} \end{cases} \quad \text{[Equation 12]}$$

④ If $A_{W,i}=0$, a probability that a container instance switches from an active state ($W_i=1$) to an inactive state is represented as Equation 13.

$$P[W_i' \mid W_i 10, A_{W,i} = 0] = \begin{cases} 1, & \text{if } W_i' = 0 \\ 0, & \text{otherwise} \end{cases} \quad \text{[Equation 13]}$$

A cost function $r(S,A)$ for minimizing inference latency is defined as Equation 14.

$$r(S,A) = \zeta_H + \xi + \zeta_I \quad \text{[Equation 14]}$$

In Equation 14, $\zeta_H$ and $\zeta_I$ denote an inference latency of a head model and an inference latency of a tail model, respectively. $\xi$ denotes a transmission latency by transmission of intermediate data between the terminal and the server (edge cloud). The inference latency of the head model depends on a splitting point and available computing power of the terminal. The inference latency of the tail model depends on a state of a container instance of the tail model, a splitting point, and available computing power of the server (edge cloud). The transmission latency is affected by a transmission rate between the terminal and the server (edge cloud) and the splitting point (i.e., a size of intermediate data).

To maintain average energy consumption of the (mobile) terminal and average resource consumption of the server (edge cloud) at a constant level, two constraint functions are defined.

The average energy consumption $c_E$ of the terminal is represented as Equation 15.

$$c_E(S,A) = E_I \quad \text{[Equation 15]}$$

In Equation 15, $E_I$ denotes energy consumption occurring when the terminal performs computing (inference) on the head model of which the splitting point is 1.

The average resource consumption $c_R$ of the server (edge cloud) is represented as Equation 16.

$$c_R(S, A) = \sum_i \delta[W_i = 1] \quad \text{[Equation 16]}$$

In Equation 16, is a delta function that returns 1 if a given condition is true, and returns 0 otherwise.

Hereinafter, an optimization process is described in detail. Also, average inference latency $\zeta_L$ desired to be minimized herein is defined as Equation 17.

$$\zeta_L = \lim_{t \to \infty} \sup \frac{1}{t} \sum_{t'}^{t} E[r(S_{t'}, A_{t'})] \quad \text{[Equation 17]}$$

In Equation 17, $S_{t'}$ and $A_{t'}$ denote a state and a chosen action at a time $t' \in T$, respectively.

The average energy consumption $\psi_E$ of the terminal and the average resource consumption $\psi_R$ of the server (edge cloud) may be represented as Equation 18 and Equation 19, respectively/

$$\psi_E = \lim_{t \to \infty} \sup \frac{1}{t} \sum_{t'}^{t} E[c_E(S_{t'}, A_{t'})] \quad \text{[Equation 18]}$$

$$\psi_R = \lim_{t \to \infty} \sup \frac{1}{t} \sum_{t'}^{t} E[c_R(S_{t'}, A_{t'})] \quad \text{[Equation 19]}$$

A CMDP model may be represented as Equation 20 and Equation 21, respectively.

$$\min_{\pi} \zeta_R \quad \text{[Equation 20]}$$

$$\text{s.t. } \psi_E \leq \theta_E \text{ and } \psi_R \leq \theta_R \quad \text{[Equation 21]}$$

$\theta_E$ and $\theta_R$ denote a threshold of the energy consumption of the terminal and a threshold of resource consumption of the server (edge cloud), respectively. Also, $\pi$ denotes a policy implying a probability of selecting a specific action in each state. Here, to acquire an optimal policy, a CMDP model is modified using linear programming (LP) and the modified equation is as follows. Stationary probabilities $\varphi(S, A)$ of the state S and the action A are defined as decision variables of an LP model to convert the CMDP model to an equivalent LP model as follows. The optimal policy may be derived by solving the following LP problem.

$$\min_{\varphi(S,A)} \sum_S \sum_A \varphi(S, A) r(S, A) \quad \text{[Equation 22]}$$

$$\sum_S \sum_A \varphi(S, A) c_{EW}(S, A) \leq \theta_E \quad \text{[Equation 23]}$$

$$\sum_S \sum_A \varphi(S, A) c_R(S, A) \leq \theta_R \quad \text{[Equation 24]}$$

$$\sum_A \varphi(S', A) = \sum_S \sum_A \varphi(S, A) P[S' \mid S, A] \quad \text{[Equation 25]}$$

$$\sum_S \sum_A \varphi(S, A) = 1 \quad \text{[Equation 26]}$$

$$\varphi(S, A) \geq 0 \quad \text{[Equation 27]}$$

Results derived from the above equation include an optimal DNN splitting point and an activation status of a container instance for minimizing latency and maximizing resource efficiency of a terminal and a cloud.

Equation 22 is an objective function that minimizes inference latency. Constraints of Equation 23 and Equation 24 correspond to constraints of the CMDP model of Equation 21. Also, a Chapman-Kolmogorov equation is applied to Equation 25. Constraints of Equation 26 and Equation 27 are required for preservation of probability characteristics.

An optimal stochastic policy $\pi^*(S, A)$ may be derived as a CMDP model solution by solving an LP problem. The optimal stochastic policy selects the action A based on the optimal probability distribution in the given state S.

Figure 2:
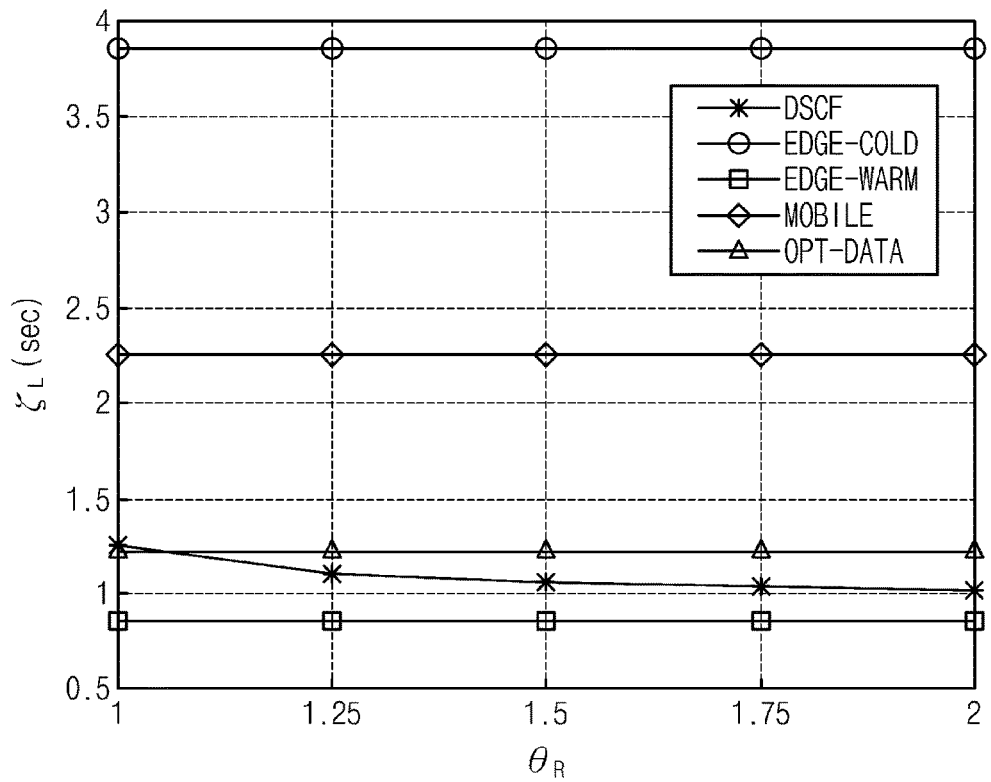
FIG. 2 is a graph showing a change in average inference latency according to a power consumption threshold of an edge cloud.

FIG. 2 is a graph showing a change in average inference latency according to a resource consumption threshold $\theta_R$ of a server (edge cloud). Referring to FIG. 2, performance of a proposed method (DSCF) is compared to the following four DNN splitting methods. Simulation comparison is performed using four methods, for example, 1) EDGE-COLD that is a method of inferring the entire DNN in an edge cloud and maintaining an instance in an inactive state, 2) EDGE-WARM that is a method of inferring the entire DNN in the edge cloud and maintaining an instance in an active state, 3) MOBILE that is a method of inferring the entire DNN in a mobile device, and 4) OPT-DATA that is a method of finding a layer with smallest intermediate data and inferring a head model from the mobile device and inferring a tail model from the edge cloud that maintains an instance in an active state.

Results of FIG. 2 show that the proposed method (DSCF) changes a latency according to a threshold and has a latency most similar to that of 2). From this, it can be known that, when the proposed method (DSCF) performs inference with an active instance, a latency decreases since more edge cloud resources are used according to an increase in a threshold.

Figure 3:
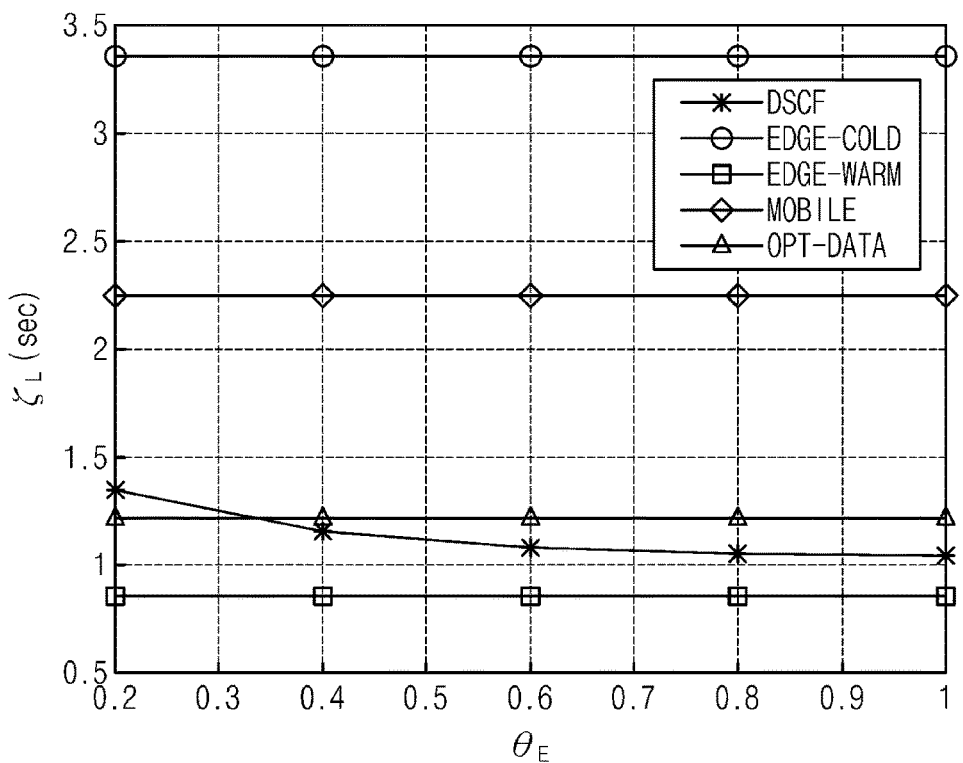
FIG. 3 is a graph showing a change in average latency according to an energy consumption threshold of a mobile device.

FIG. 3 is a graph showing a change in average latency according to an energy consumption threshold of a mobile device. When compared to 3) the method of inferring the entire DNN, the proposed method (DSCF) selects a splitting point that minimizes a latency based on the limited energy consumption and has the average latency lower than that of 3) accordingly. Dissimilar to other methods of FIG. 3, it can be known that a latency decreases according to an increase in energy consumption of the mobile device. This is because, when compared to 4) the method of equally dividing a DNN into a head model and a tail model, the proposed method (DSCF) selects a splitting point that adaptively minimizes latency according to a change of $\theta_E$.

Figure 4:
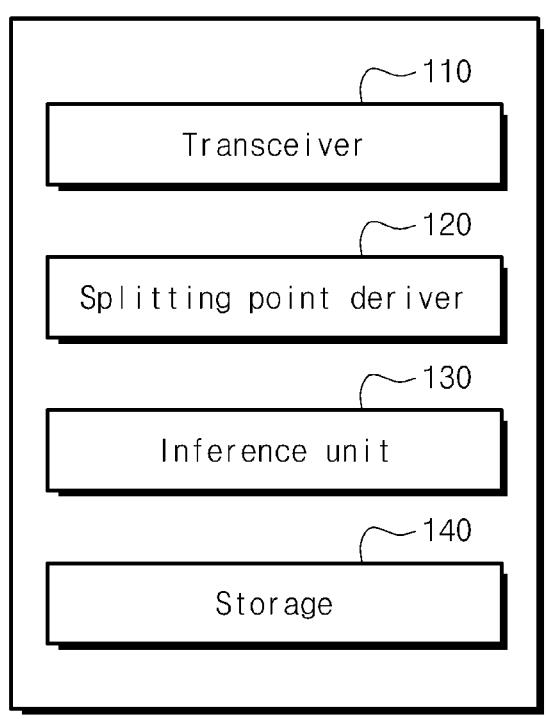
FIG. 4 is a functional block diagram of a server of FIG. 1.

FIG. 4 is a functional block diagram of a server of FIG. 1.

Referring to FIG. 4, a server 100 operating in a serverless edge computing environment and also referable to as a (dynamic) split computing device includes a transceiver 110, a splitting point deriver 120, and an inference unit 130. Depending on example embodiments, the server 100 may further include a storage 140.

The transceiver 110 may periodically or aperiodically receive information of a terminal (e.g., (available) computing power of the terminal) from the terminal. Also, the transceiver 110 may receive inference results of a head model of a predetermined DNN model, that is, intermediate data, from the terminal. The received information of the terminal and/or intermediate data may be stored in the storage 140.

Depending on example embodiments, the transceiver 110 may measure a data transmission speed (transmission rate) between the terminal and the server 100 in a process of receiving the information and/or the intermediate data from the terminal, and may store the measured data transmission rate in the storage 140.

The splitting point deriver 120 may determine a splitting point of the DNN model and/or an activation status of a container instance of each tail model for split computing using information of the terminal (e.g., computing power of the terminal) received by the transceiver 110, the data transmission rate, and computing power of the server 100. The splitting point and/or the activation status of the container instance may be determined through the aforementioned optimization process. The splitting point determined by the splitting point deriver 120 may be transmitted to the terminal through the transceiver 110. Therefore, with respect to a predetermined input, the terminal may derive inference results (intermediate data) for the head model of the DNN model (i.e., a model that includes only layers up to the splitting point and may transmit the derived intermediate data to the server 100. Data temporarily or non-temporarily generated in a process of deriving the splitting point and/or determining the activation status of the container instance by the splitting point deriver 120 may be stored in the storage 140.

Depending on example embodiments, the splitting point deriver 120 may periodically or aperiodically perform an operation of deriving the splitting point and/or determining the activation status of the container instance.

The inference unit 130 may derive final results of the DNN model by performing inference for inference results of the head model of the DNN model, that is, intermediate data, received through the transceiver 110 through the tail model. Inference results by the tail model (i.e., final results of the DNN model) may be transmitted to the terminal through the transceiver 110.

Also, the inference unit 130 may receive information on the splitting point determined by the splitting point deriver 120 and may maintain only a container instance for the tail model corresponding to layers after the received splitting point to be in an active state. By activating only a corresponding container instance, it is possible to minimize a response latency (inference latency) to intermediate data received from the terminal. By maintaining remaining container instances in an inactive state, it is possible to increase available resources of the server 100.

An operating system (OS), a program, a source code, etc., required for an operation of the server 100 may be stored in the storage 140. Also, tail models according to the respective splitting points of the DNN model may be stored in the storage 140. Also, data received by the transceiver 110 (available computing power of the terminal, intermediate data), the splitting point derived by the splitting point deriver 120 and/or activation status of each container instance, and inference results by the inference unit 130 may be stored in the storage 140.

The aforementioned method according to example embodiments may be implemented in a form of a program executable by a computer apparatus. Here, the program may include, alone or in combination, a program instruction, a data file, and a data structure. The program may be specially designed to implement the aforementioned method or may be implemented using various types of functions or definitions known to those skilled in the computer software art and thereby available. Also, here, the computer apparatus may be implemented by including a processor or a memory that enables a function of the program and, if necessary, may further include a communication apparatus.

The program for implementing the aforementioned method may be recorded in computer-readable record media. The media may include, for example, a semiconductor storage device such as an SSD, ROM, RAM, and a flash memory, magnetic disk storage media such as a hard disk and a floppy disk, optical record media such as disc storage media, a CD, and a DVD, magneto optical record media such as a floptical disk, and at least one type of physical device capable of storing a specific program executed according to a call of a computer such as a magnetic tape.

Although some example embodiments of an apparatus and method are described, the apparatus and method are not limited to the aforementioned example embodiments. Various apparatuses or methods implementable in such a manner that one of ordinary skill in the art makes modifications and alterations based on the aforementioned example embodiments may be an example of the aforementioned apparatus and method. For example, although the aforementioned techniques are performed in order different from that of the described methods and/or components such as the described system, architecture, device, or circuit may be connected or combined to be different form the above-described methods, or may be replaced or supplemented by other components or their equivalents, it still may be an example embodiment of the apparatus and method for obtaining a vulnerable transaction sequence in a program.

The device described above can be implemented as hardware elements, software elements, and/or a combination of hardware elements and software elements. For example, the device and elements described with reference to the embodiments above can be implemented by using one or more general-purpose computer or designated computer, examples of which include a processor, a controller, an ALU (arithmetic logic unit), a digital signal processor, a microcomputer, an FPGA (field programmable gate array), a PLU (programmable logic unit), a microprocessor, and any other device capable of executing and responding to instructions. A processing device can be used to execute an operating system (OS) and one or more software applications that operate on the said operating system. Also, the processing device can access, store, manipulate, process, and generate data in response to the execution of software. Although there are instances in which the description refers to a single processing device for the sake of easier understanding, it should be obvious to the person having ordinary skill in the relevant field of art that the processing device can include a multiple number of processing elements and/or multiple types of processing elements. In certain examples, a processing device can include a multiple number of processors or a single processor and a controller. Other processing configurations are also possible, such as parallel processors and the like.

The software can include a computer program, code, instructions, or a combination of one or more of the above and can configure a processing device or instruct a processing device in an independent or collective manner. The software and/or data can be tangibly embodied permanently or temporarily as a certain type of machine, component, physical equipment, virtual equipment, computer storage medium or device, or a transmitted signal wave, to be interpreted by a processing device or to provide instructions or data to a processing device. The software can be distributed over a computer system that is connected via a network, to be stored or executed in a distributed manner. The software and data can be stored in one or more computer-readable recorded medium.

A method according to an embodiment of the invention can be implemented in the form of program instructions that may be performed using various computer means and can be recorded in a computer-readable medium. Such a computer-readable medium can include program instructions, data files, data structures, etc., alone or in combination. The program instructions recorded on the medium can be designed and configured specifically for the present invention or can be a type of medium known to and used by the skilled person in the field of computer software. Examples of a computer-readable medium may include magnetic media such as hard disks, floppy disks, magnetic tapes, etc., optical media such as CD-ROM's, DVD's, etc., magneto-optical media such as floptical disks, etc., and hardware devices such as ROM, RAM, flash memory, etc., specially designed to store and execute program instructions. Examples of the program instructions may include not only machine language codes produced by a compiler but also high-level language codes that can be executed by a computer through the use of an interpreter, etc. The hardware mentioned above can be made to operate as one or more software modules that perform the actions of the embodiments of the invention and vice versa.

While the present invention is described above referencing a limited number of embodiments and drawings, those having ordinary skill in the relevant field of art would understand that various modifications and alterations can be derived from the descriptions set forth above. For example, similarly adequate results can be achieved even if the techniques described above are performed in an order different from that disclosed, and/or if the elements of the system, structure, device, circuit, etc., are coupled or combined in a form different from that disclosed or are replaced or substituted by other elements or equivalents. Therefore, various other implementations, various other embodiments, and equivalents of the invention disclosed in the claims are encompassed by the scope of claims set forth below.

What is claimed is:

1. A split computing device operating in a serverless edge computing environment, the split computing device comprising:
    a transceiver configured to receive resource information of a terminal from the terminal and to measure a data transmission rate between the terminal and the split computing device in a process of receiving the resource information from the terminal;
    a splitting point deriver configured to determine a splitting point of a deep neural network (DNN) model and an activation status of a container instance for each of tail models of the DNN for split computing using the resource information of the terminal, the data transmission rate, and resource information of the split computing device,
    wherein the transceiver is configured to receive, from the terminal, intermediate data that is inference results for a head model of the DNN model for the determined splitting point; and
    an inference unit configured to derive final results of the DNN model by performing inference on the intermediate data to derive inference results for a tail model of the DNN model for the determined splitting point,
    wherein the inference results derived by the inference unit are transmitted to the terminal via the transceiver.

2. The split computing device of claim 1, wherein the splitting point of the DNN model determined by the splitting point deriver is transmitted to the terminal via the transceiver.

3. The split computing device of claim 1, wherein the received resource information of the terminal and the intermediate data are stored in a storage.

4. The split computing device of claim 1, wherein the resource information of the terminal includes available computing power of the terminal and the resource information of the split computing device includes available computing power of the split computing device, and
    wherein the splitting point deriver is configured to determine the splitting point capable of minimizing an inference latency while maintaining a computing power of the terminal below a first threshold and a computing power of the split computing device below a second threshold.

5. The split computing device of claim 4, wherein the inference latency is a sum of an inference latency of a head model for each splitting point, a transmission latency due to transmission of intermediate data corresponding to results of the head model, and an inference latency of a tail model.

* * * * *